United States Patent [19]
Sturm et al.

[11] Patent Number: 5,084,656
[45] Date of Patent: Jan. 28, 1992

[54] CRT BEAM DEFLECTION CONTROL SYSTEM

[75] Inventors: Thomas A. Sturm, Littleton; James L. Martin, Evergreen, both of Colo.

[73] Assignee: Alliant Techsystems, Inc., Littleton, Colo.

[21] Appl. No.: 650,690

[22] Filed: Feb. 5, 1991

[51] Int. Cl.$^5$ .................... H01J 29/70; H01J 29/72
[52] U.S. Cl. ................................ 315/364; 358/485
[58] Field of Search ............ 315/364, 399; 358/901, 358/68, 69, 70, 474, 480, 481, 485, 494

[56] References Cited

U.S. PATENT DOCUMENTS 3,739,224 6/1973 Morrey ............................. 315/27
3,860,753 1/1975 Tsuneta et al. .................. 358/485

Primary Examiner—Theodore M. Blum
Attorney, Agent, or Firm—James R. Young

[57] ABSTRACT

Disclosed is a system having a vertical position register and a horizontal deflection controller to position an electron beam within a CRT used to project an image onto a photographic medium for printing. When data is being displayed on the CRT, the beam is positioned vertically to the desired color phosphor row and then swept across the face of the CRT while the data is used to modulate the beam. During retrace, the beam is stopped at the center of the CRT and displaced vertically to a home position while waiting for the next dot row of information. The home position is located above the center of the phosphor area so that no leakage occurs if the beam remains in the home position for extended periods. Furthermore, while in the home position at the center of the CRT, the horizontal deflection amplifier dissipates a minimum amount of power.

17 Claims, 7 Drawing Sheets

| STATE \ SIGNAL | ENABLE LATCH | OUTPUT ENABLE | RETRACE | SWEEP | LOAD COUNTER |
| --- | --- | --- | --- | --- | --- |
| 0 | 0 | 0 | 0 | 0 | 1 |
| 1 | 0 | 0 | 0 | 0 | 1 |
| 2 | 0 | 0 | 0 | 0 | 1 |
| 3 | 1 | 1 | 1 | 0 | 0 |
| 4 | 1 | 1 | 0 | 0 | 0 |
| 5 | 0 | 1 | 0 | 1 | 0 |
| 6 | 0 | 1 | 0 | 0 | 0 |
| 7 | 0 | 1 | 1 | 0 | 0 |

FIG. 6

CRT BEAM DEFLECTION CONTROL SYSTEM

FIELD OF THE INVENTION

This invention relates to printers for computer systems and more particularly to Cathode Ray Tube (CRT) display systems within such printers. Even more particularly, the invention relates to controlling the beam deflection within a CRT display system of such a printer.

BACKGROUND OF THE INVENTION

Variable speed photographic process printers that utilize CRT's for media exposure typically use linear deflection amplifiers to sweep the electron beam across the face of the CRT. A deflection cycle normally consists of a sweep, retrace, and hold period. During the sweep period, the CRT is unblanked and the beam is driven horizontally at a given vertical position while being modulated to expose the media. During the retrace period, the CRT is blanked and the beam is returned to a home position to wait for the start of the next sweep. Thus, the sweep and retrace periods are typically fixed time intervals. The beam is then held in the home position for the hold period until a new sweep is initiated. Therefore, the hold period is a variable time interval dependent on the print speed.

In typical prior art systems, the home position is at one end of the sweep. This requires the deflection amplifier to be held in a high current state in order to hold the beam at the end of the sweep. Thus the home position is a state of high power dissipation in the deflection amplifier. This causes a significant heat problem at low print speeds when the horizontal deflection amplifier must remain in a high power dissipation state for relatively long periods.

The sweep must normally be compensated for static and dynamic errors in order to cause the beam velocity across the CRT screen to be constant. A varying hold period affects the dynamics of the front end of the sweep period. Since the deflection amplifiers do not have infinite bandwidth, the beam dynamics at the start of each trace will be affected by the conditions prior to the start of the trace. A varying hold period makes these conditions variable causing beam dynamics to be difficult to control. The result is that beam velocity in the front end of the sweep changes with print speed and is particularly noticeable at high speeds when the hold time is short.

Another problem occurs when the beam is held at one end of the sweep during the hold time. Although the beam is blanked during the hold period, some leakage can occur. Since the beam is directed at an area of the CRT that can expose the print media, and since the hold period can be long, a small amount of leakage over this long period can cause unwanted exposure of the print media.

It is thus apparent that there is a need in the art for an improved system that reduces power dissipation in the deflection amplifier during the hold period. There is a further need in the art for a system to prevent leakage exposure of the print media during the hold period. There is a still further need for a system to eliminate dynamic deflection errors at the front end of each sweep. The present invention meets these needs.

SUMMARY OF THE INVENTION

It is an aspect of the present invention to control the electron beam deflection within a cathode ray tube (CRT) of a photographic type printer.

It is another aspect of the invention to position the CRT beam to prevent long term exposure leak during printer idle periods.

Still another aspect is to position the CRT beam to reduce power consumption and minimize power dissipation of the deflection amplifiers during printer idle periods.

A further aspect of the invention is to position the CRT beam at the center of the CRT but outside the phosphor exposure area.

A still further aspect of the present invention is to eliminate dynamic errors at the front end of each sweep by stabilizing the conditions prior to the start of each sweep.

The above and other aspects of the invention are accomplished in a system having a memory mapped deflection including a vertical register and a horizontal deflection controller to control the position of an electron beam within a CRT used to project a color image onto a photographic medium for printing. When data is being displayed on the CRT, the beam is positioned vertically to the desired color phosphor row and then swept across the face of the CRT while the data is used to modulate the beam. During retrace, the beam is stopped at the center of the CRT and displaced vertically to a home position while waiting for the next deflection cycle. The home position is located above the center of the phosphor area so that no leakage occurs if the beam remains in the home position for extended periods. Furthermore, while in the home position at the center of the CRT, the horizontal deflection amplifier dissipates a minimum amount of power.

When a new deflection cycle starts, the retrace is completed bringing the beam to the left side of the CRT and the horizontal sweep is then started. In this manner, the conditions prior to the start of each horizontal sweep are very consistent, which eliminates dynamic errors.

BRIEF DESCRIPTION OF THE DRAWINGS

The above and other objects, features, and advantages of the invention will be better understood by reading the following more particular description of the invention, presented in conjunction with the following drawings, wherein:

FIG. 6 shows an output table for the states of FIG. 5; and

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
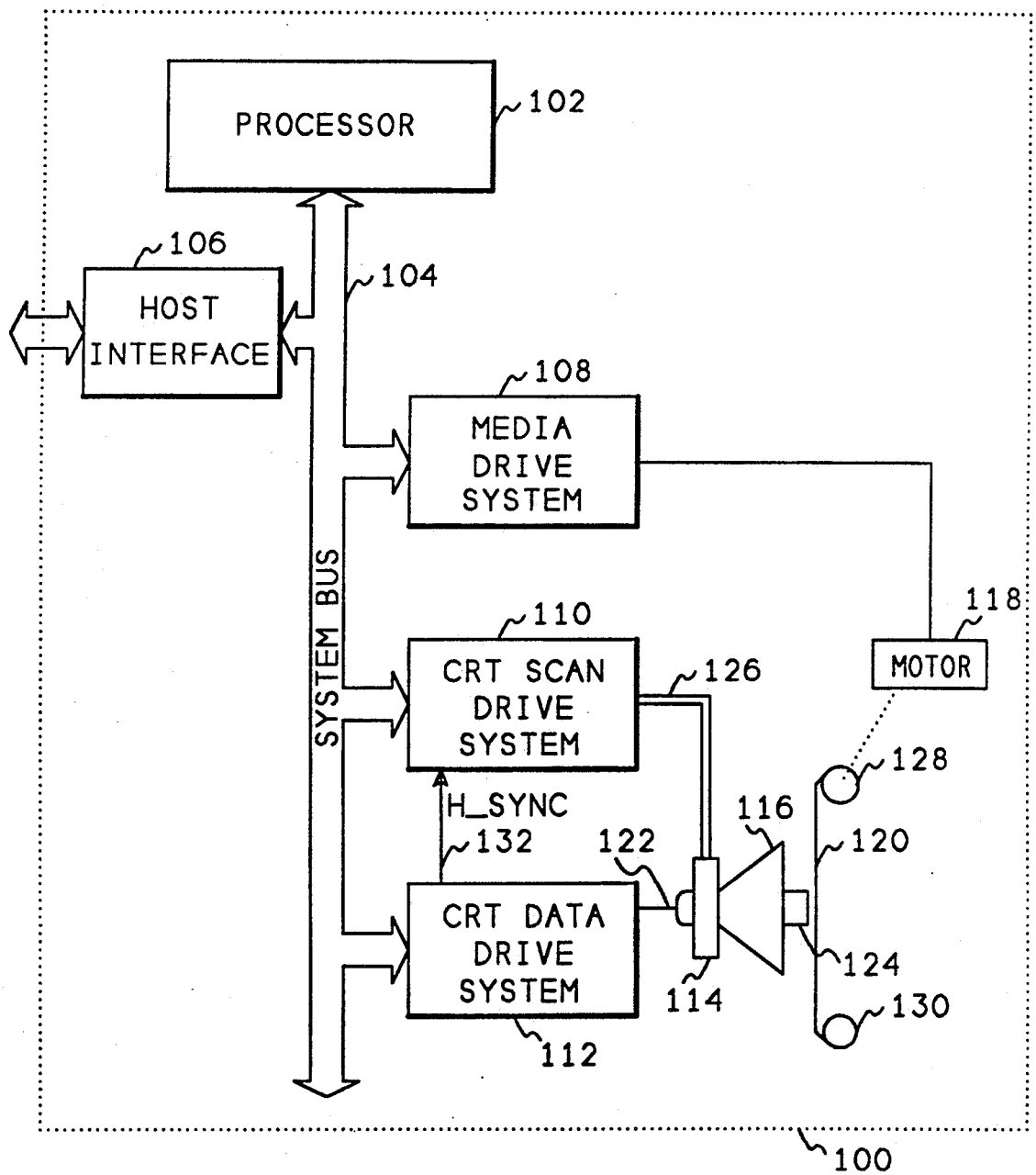
FIG. 1 shows a block diagram of a printer incorporating the present invention.

FIG. 1 shows a block diagram of a printer incorporating the present invention. Referring now to FIG. 1, a printer 100 contains a processor 102 which communicates to other components of the system over a system bus 104. The processor 102 uses a host interface 106 to receive data from a host system (not shown), and the processor 102 stores this data in a CRT data drive system 112. The output 122 of the CRT data drive system 112 is connected to a CRT 116 and used to modulate the electron beam within the CRT 116. Data displayed on the face of the CRT 116 is conducted through a CRT fiber optic faceplate 124 to print media 120. The print media 120 is a photosensitive media capable of recording the image displayed on the CRT and conducted through the CRT fiber optic faceplate 124. Deflection of the electron beam of the CRT 116 is controlled by a CRT scan drive system 110 whose output 126 is connected to a yoke 114 of the CRT 116. The CRT data drive system 112 controls the start of each horizontal trace through an H_SYNC signal 132. The present invention is incorporated within the CRT scan drive system 110.

The print media 120 is moved by a paper roll 128 which is powered by a motor 118. The motor 118 is operated by a paper drive system 108 which is controlled over the system bus 104 by the processor 102.

Operation of the system begins when data is received over the host interface 106. The processor 102 takes the data from the host interface 106 and stores the data in the CRT drive system 112. The CRT drive system 112 converts the data to a series of dot rows of the appropriate color to produce the appropriate image desired. The paper drive system 108 is then used to position the media 120 in front of either a red, green, or blue phosphor stripe on the face of the fiber optic faceplate 124. The CRT scan drive system 110 is then activated to scan the electron beam across the appropriate phosphor stripe while the CRT data drive system 112 modulates the CRT beam intensity to expose the print media. The print media is then moved a fixed distance, and the process is repeated for one of the other colors. One dot row of data is complete after all three phosphors—red, green, and blue—have been scanned.

Figure 2:
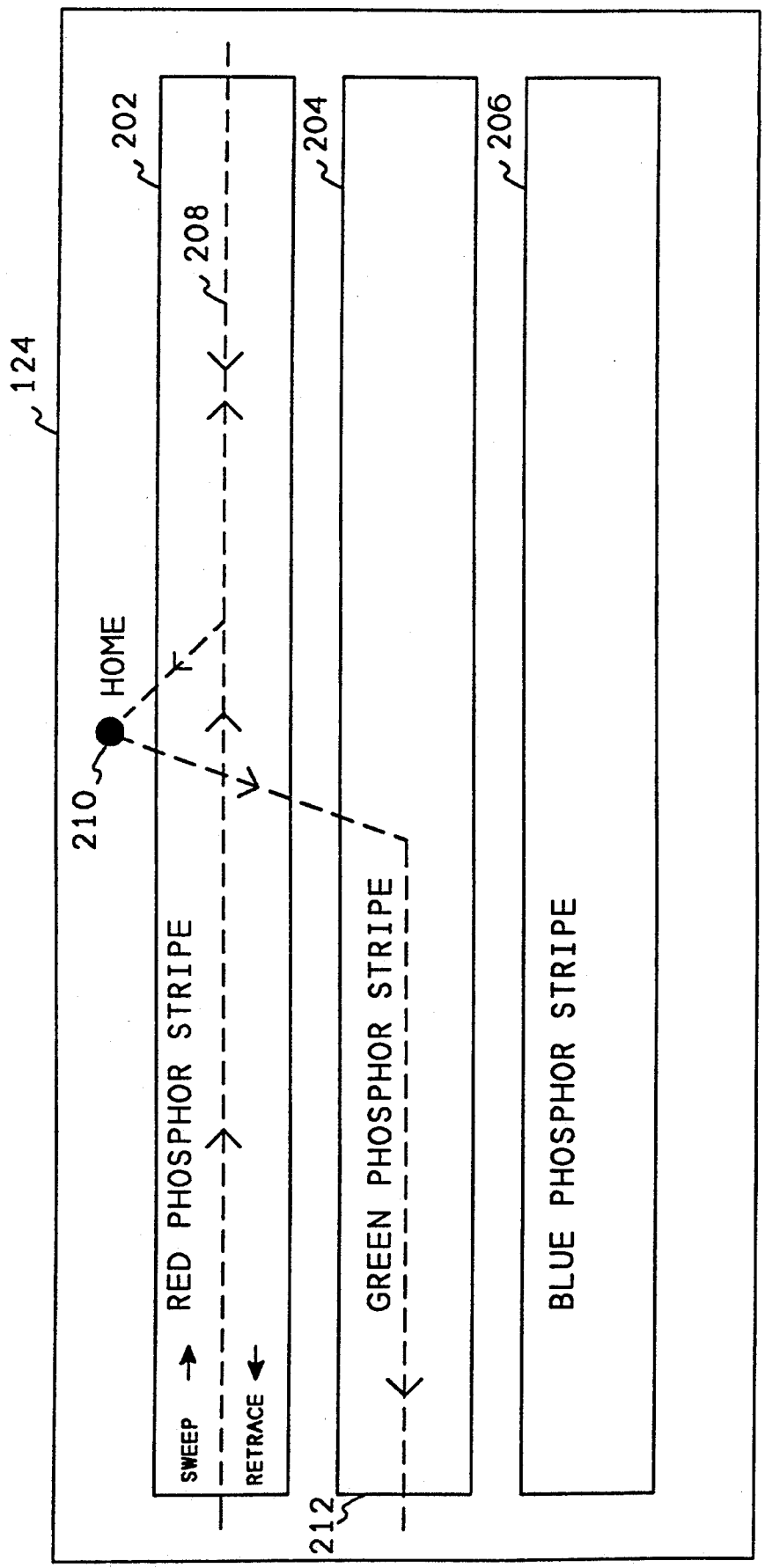
FIG. 2 shows a diagram of the face of the CRT used with the present invention.

FIG. 2 shows a diagram of the face of the fiber optic faceplate 124, and illustrates the three phosphor stripes as well as the home position of the present invention. Referring now to FIG. 2, the CRT fiber optic faceplate 124 contains a red phosphor stripe 202, a green phosphor stripe 204, and a blue phosphor stripe 206. A dotted line 208 shows the sweep and retrace lines for the electron beam across the face of the CRT 116 (FIG. 1) and the fiber optic faceplate 124. During retrace of the CRT beam 208, the beam is directed to a home position 210 which is located above the three phosphor stripes, and the beam remains in this position until the next phosphor stripe is to be scanned. The aspects of the present invention are accomplished by keeping the CRT beam in this home position during idle periods. That is, while the CRT beam is in the home position 210, exposure leak will not occur because the CRT beam is kept outside the phosphor stripes on the CRT fiber optic faceplate, thus the beam is incapable of exposing the media. By placing the CRT beam at the home position 210 above the red phosphor stripe 202, even if leakage occurs, no light will be conducted through the fiber optic faceplate 124 to the media. Also, since the electron beam is in the center of the CRT, power dissipation within the horizontal amplifiers is significantly reduced, thus minimizing thermal dissipation requirements of the deflection amplifiers. When a new dot row is to be scanned, the beam moves from the home position 210 to the left side 212 to begin the next sweep. Since the next sweep is always immediately preceded by the completion of the retrace, the initial conditions for a sweep are consistent, thus eliminating dynamic errors.

Figure 3:
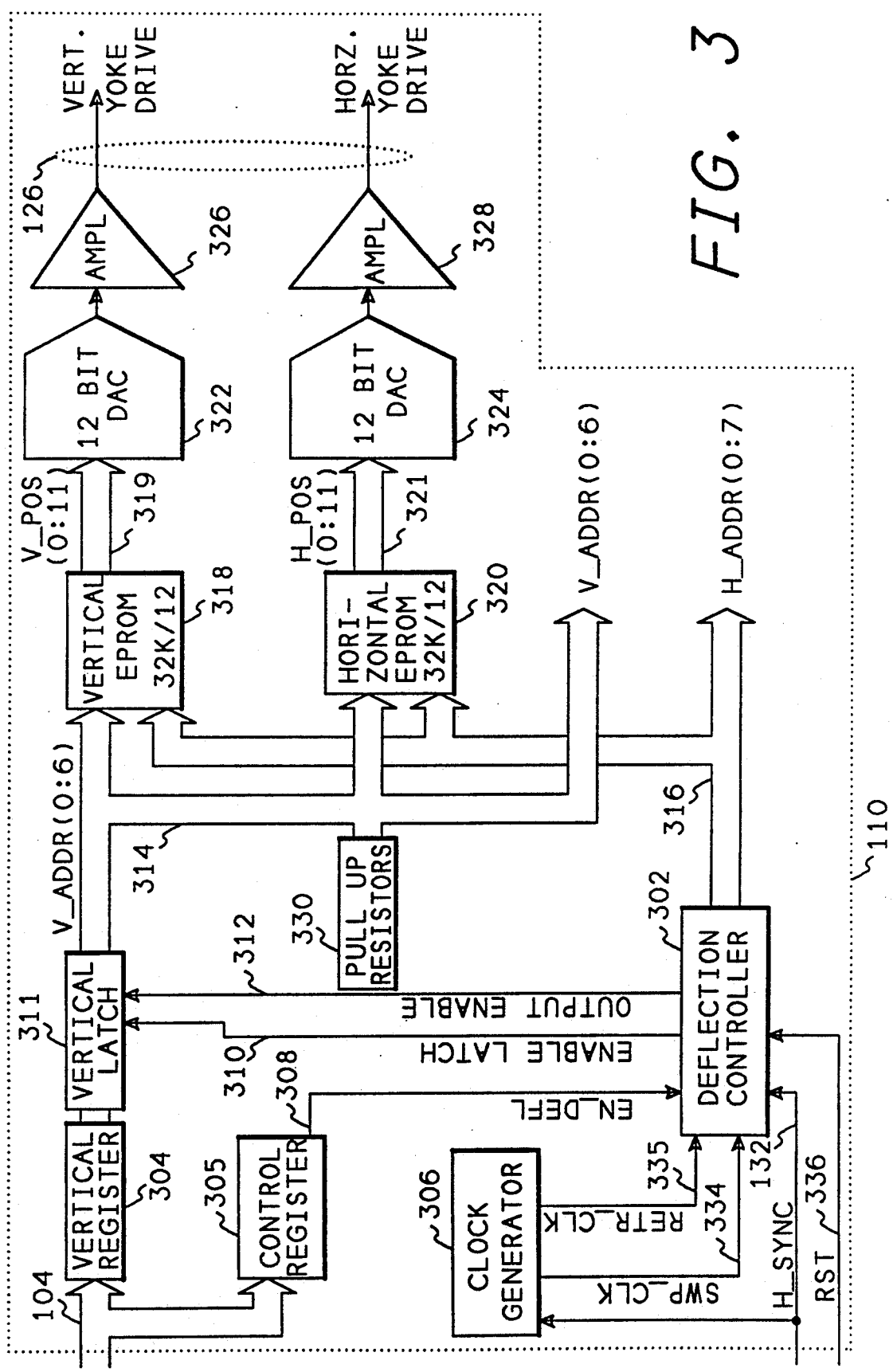
FIG. 3 shows a block diagram of the present invention.

FIG. 3 shows a block diagram of the CRT scan drive system 110 (FIG. 1) incorporating the present invention. Referring now to FIG. 3, the CRT scan drive system 110 contains a deflection controller 302 which creates the data necessary to cause a sweep and retrace of the CRT beam, and to place the CRT beam into the home position 210 (FIG. 2). A vertical register 304 receives a vertical address from the CPU over the system bus 104. The vertical address is used to select either a red, green, or blue phosphor stripe on the face of the CRT 116 (FIG. 1). The vertical address is transferred to vertical latch 311 by and enable latch signal 310. The output V_ADDR 314 of the vertical latch 311 is a seven bit bus that is connected to a vertical EPROM 318. V_ADDR 314 also connects to a horizontal EPROM 320. The output of the deflection controller 302 is an eight bit H_ADDR bus 316 which is also connected to the vertical EPROM 318 and the horizontal EPROM 320. Data on the V_ADDR bus 314 and the H_ADDR bus 316 are converted by the vertical EPROM 318 into a twelve bit vertical position signal V_POS 319 which is connected to a twelve bit D to A converter 322. The output of the D to A converter is amplified by an amplifier 326 and connected through signal 126 to the vertical yoke drive on the CRT 116. Data on the V_ADDR bus 314 and the H_ADDR bus 316 are also connected to the horizontal EPROM 320. The horizontal EPROM 320 converts these two values into a twelve bit horizontal position value H_POS 321 which is connected to a horizontal position twelve bit D to A converter 324. The output of the horizontal position D to A converter 324 is amplified by amplifier 328 and connected through signal 126 to the horizontal drive yoke. The vertical drive yoke signal and the horizontal drive yoke signal comprise the output 126 of the CRT scan drive system 110 (FIG. 1). The operation of this circuit will be more fully described with respect to FIGS. 4, 5, and 6 below.

Figure 4:
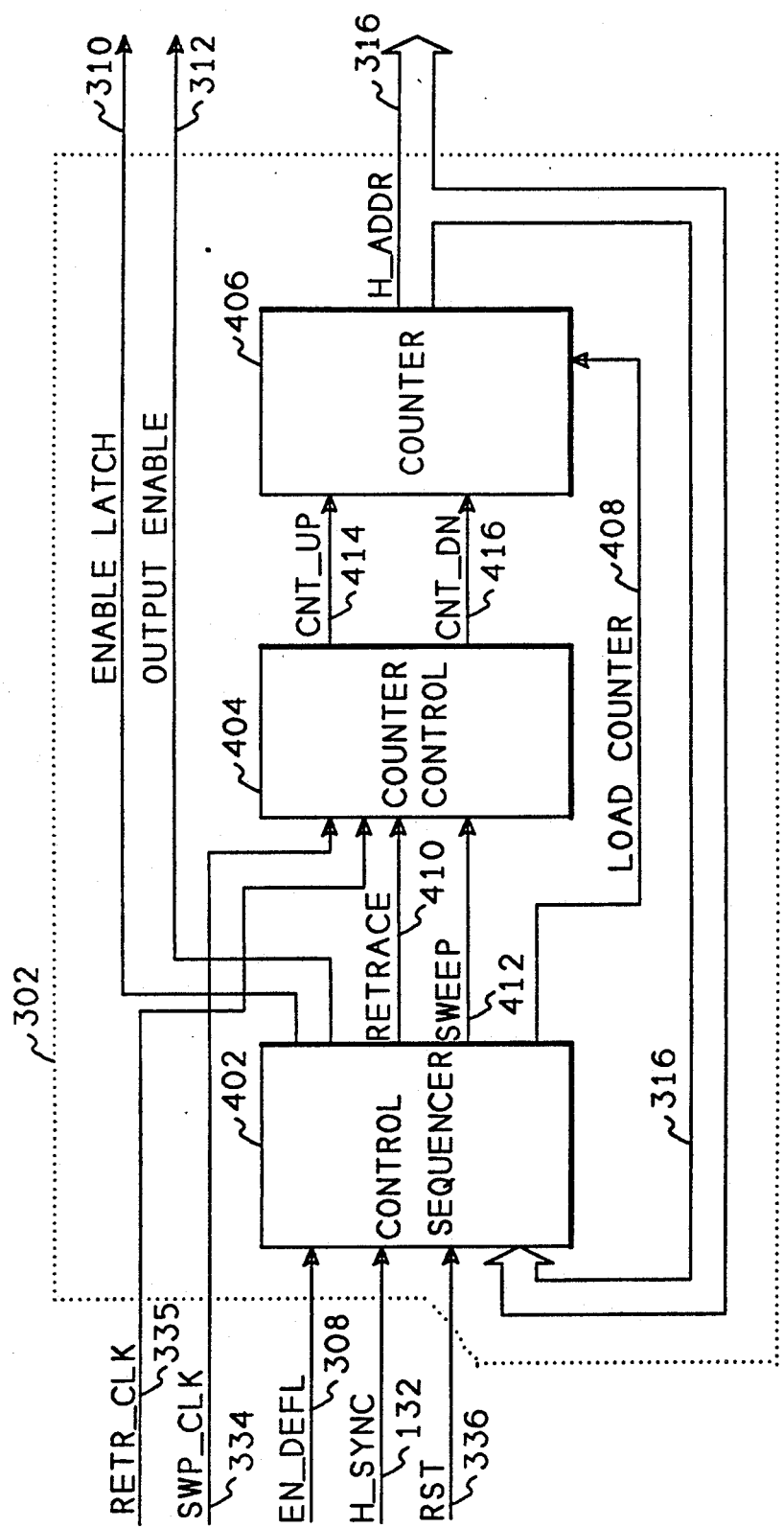
FIG. 4 shows a block diagram of the deflection controller of FIG. 3.

FIG. 4 shows a block diagram of the deflection controller 302 of FIG. 3. Referring now to FIG. 4, the deflection controller 302 contains a control sequencer 402 which controls all the functions within the deflection controller 302. The operation of the control sequencer 402 will be described below with respect to FIGS. 5 and 6. The control sequencer 402 sends a RETRACE signal 410 and a SWEEP signal 412 to a counter control circuit 404. The counter control circuit 404 controls the up or down counting of a counter 406 through a pair of signals CNT_UP 414 and CNT_DN 416. A LOAD COUNTER signal 408 is sent from the control sequencer 402 to the counter 406 to cause it to load a preset value. The output of the counter 406 is the eight bit H_ADDR bus 316 which was described above with respect to FIG. 3. The H_ADDR bus 316 also connects to the control sequencer 402 so that the control sequencer 402 can determine the count value in the counter 406.

Figure 5:
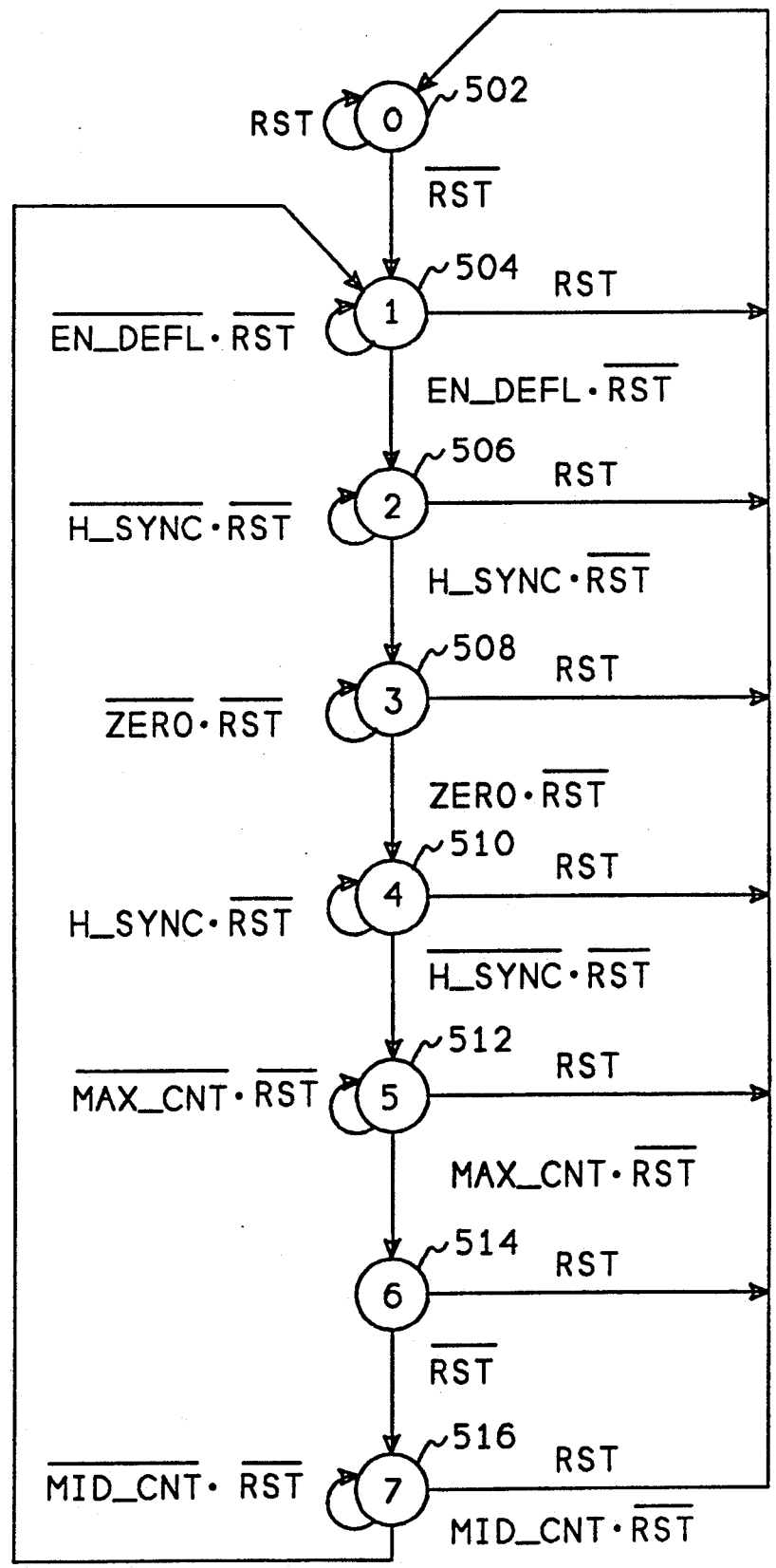
FIG. 5 shows a state diagram of the control sequencer of FIG. 4.

FIG. 5 shows a state machine diagram of the functions of the control sequencer 402 and FIG. 6 shows an output table showing the signals output by the control sequencer 402 for each of the states shown in FIG. 5. In FIG. 6, a 1 (one) at the intersection of a state and a signal means that the signal will be asserted by that state and a 0 _(zero) at the intersection means that the signal will not be asserted by the state. Referring now to FIGS. 5 and 6, after power up or a reset, the state machine is forced to state zero 502 by the presence of the RST signal 336 (FIGS. 3 and 4). Once the start up or reset sequencing is complete in other parts of the machine, the RST signal 336 will be removed and the state machine then goes to state one 504. As shown in FIG. 6, while the state machine is in either state zero 502 or state one 504, the control sequencer 402 will assert the LOAD COUNTER signal 408 but will not assert any of the other signals. This causes the counter 406 to load a preset value, called the mid-count value, which will force the horizontal trace to the middle of the screen at the location of the home position 210 (FIG. 2). Also, the OUTPUT ENABLE signal 312 is not asserted in either state zero 502 or state on 504. The OUTPUT ENABLE signal 312 enables the tri-state output of vertical latch 311 (FIG. 3) to allow the vertical latch data onto the V_ADDR bus 314. Since the OUTPUT ENABLE signal 312 is not asserted, latch 311 is disabled and the latched vertical address is not gated onto the V_ADDR bus 314, therefore, pull up resistors 330 (FIG. 3) force all bits of the V_ADDR bus 314 to a logical one. The combination of the preset count value created by the LOAD COUNTER signal 408 and the pull up resistors 330 force the H_ADDR bus 316 and V_ADDR bus 314 to a value that will cause the vertical EPROM 318 and the horizontal EPROM 320 to place the electron beam into the home position 210, as shown in FIG. 2.

The state machine remains in state one 504 until an EN_DEFL signal 308 (FIG. 3) is received. When the EN_DEFL signal 308 is received, the state machine goes to state two 506. In state two 506 the state machine waits for the assertion of horizontal sync as indicated by the H_SYNC signal 132 (FIGS. 1, 3 and 4). When the H_SYNC signal 132 is received, the state machine goes to state three 508. While in state three 508 the state machine will cause the electron beam to retrace to the left side of the CRT 116. Therefore, as shown in FIG. 6, state three 508 outputs the RETRACE signal 410 as well as the ENABLE LATCH signal 310 and the OUTPUT ENABLE signal 312. The ENABLE LATCH signal 310 allows the vertical latch to be loaded by the vertical register which is updated each deflection cycle by the processor 102 (FIG. 1). The OUTPUT ENABLE signal 312 enables vertical latch 311 to connect the latched vertical address to the V_ADDR bus 314. The RETRACE signal 410 causes the counter control circuit 404 (FIG. 4) to output the CNT_DN signal 416 which causes the counter 406 to decrement and retrace the sweep to the left edge of the CRT 116. The state machine remains in state three 508 until the counter 406 decrements to zero, at which time the state machine moves to state four 510. The ZERO signal is created by the control sequencer 402 when it detects that the H ADDR bus 316 has a count of zero. The state machine remains in state four while H SYNC 132 is asserted, and when H_SYNC 132 falls the state machine moves to state five 512 to start the sweep. In state five 512 the ENABLE LATCH signal 310 is unasserted, thus freezing the contents of the vertical latch 311. At this time the vertical latch 311 has already been loaded from the vertical register 304 with a vertical address to cause the trace to sweep either a red phosphor stripe 202, a green phosphor stripe 204, or a blue phosphor stripe 206 as shown in FIG. 2. In state five 512 the SWEEP signal 412 is asserted which causes the counter control circuit 404 to gate the SWP_CLK signal 334 to the CNT_UP signal 414 causing the counter 406 to count up. The state machine remains in state five 512 while the electron beam is sweeping from the left side to the right side of the CRT 116. When the sweep reaches the right side of the CRT 116, the counter 406 reaches a maximum count value, and this value is detected by the control sequencer 402 which creates a signal called MAX_CNT. When the MAX_CNT signal is asserted, the state machine moves to state six 514. In state six 514, the SWEEP signal 412 is removed causing the counter control circuit 404 to discontinue the CNT_UP signal 414 causing the counter 406 to stop its counting.

The state machine then moves automatically to state seven to start the retrace process. In state seven, as shown in FIG. 6, the RETRACE 410 signal is asserted. The RETRACE signal 410 causes the counter control 404 to gate the RETR_CLK signal 335 to the CNT_DN signal 416 which causes the counter 406 to start decrementing its count. This causes the electron beam to start retracing. When the electron beam has retraced to the home position 210 (FIG. 2), the counter 406 has decremented to the mid-count value. The control sequencer 402 detects the mid-count value and creates a signal called MID_CNT. When the MID_CNT signal is received, the state machine goes to state one 504. As discussed above, while in state one 504, the state machine disables the OUTPUT ENABLE signal 312, tri-stating the vertical latch 311, thus allowing the V_ADDR bus 314 to be pulled high by the pull up resistors 330. Also, the RETRACE 410 and SWEEP 412 signals are both unasserted, therefore, the counter control circuit 404 does not assert either the CNT_UP signal 414 nor the CNT_DN signal 416 so the counter 406 remains at the mid-count value. The mid-count value on the H_ADDR bus 316 in combination with the V_ADDR bus 314 being pulled to an all ones state causes the electron beam to be positioned at the home position 210 (FIG. 2).

Figure 7:
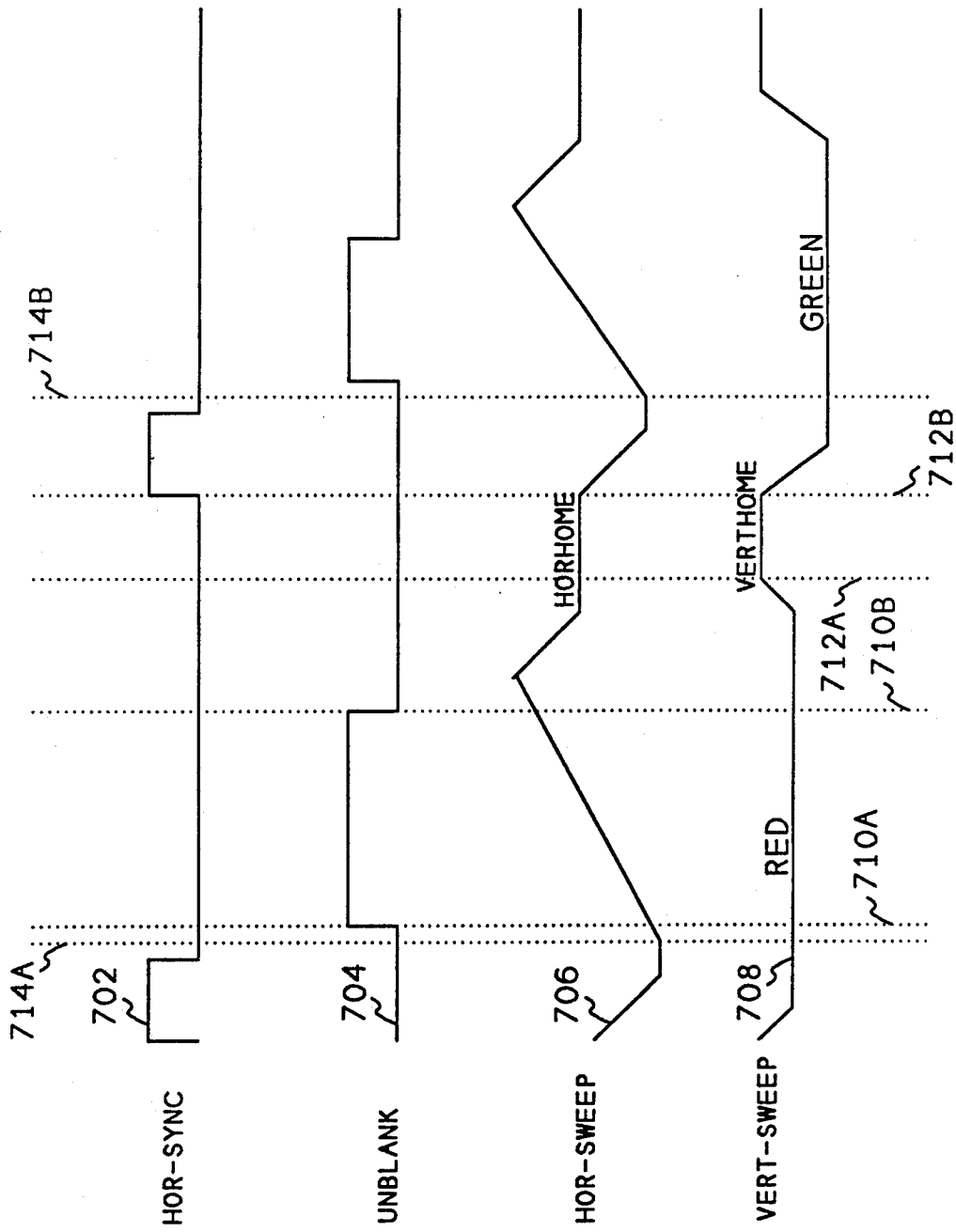
FIG. 7 shows waveforms for signals of the system of the present invention.

FIG. 7 shows an example of the waveforms that would be sent to the CRT during the scan of a line. Referring now to FIG. 7, the HORIZONTAL SYNC signal 702 defines the start of each sweep of the electron beam across the face of the CRT 116 (FIG. 1). This signal is also present as H_SYNC 132 (FIGS. 1, 3 and 4). The UNBLANK signal 704 determines when the electron beam is allowed to reach the face of the CRT to illuminate the phosphor. The HORIZONTAL SWEEP signal 706 is the output of amplifier 328 (FIG. 3) and defines when the electron beam is moving horizontally. The VERTICAL SWEEP signal 708 is the output of amplifier 326 (FIG. 3) and determines the vertical location of the electron beam during the horizontal sweep. During the period bounded by dashed lines 710A and 710B, the electron beam is sweeping horizontally over the red phosphor stripe and the beam is unblanked, therefore, information will be displayed on the CRT. During the period bounded by dashed lines 712A and 712B the electron beam is in the home position 210 (FIG. 2) where no leakage can occur, and where the power amplifier 328 (FIG. 3) is in its lowest power state.

Dashed lines 714A and 714B indicate the start of the two sweeps shown in FIG. 7, and serve to show the consistent initial conditions created by the present invention. Since the amplifiers 326 and 328 (FIG. 3) do not have infinite bandwidth, the performance of the beam at the start of each sweep will be affected by the conditions prior to the start of the sweep. In prior art systems where the beam is held at the left position prior to the start of each sweep, these conditions were variable since the hold time was variable. As shown by horizontal sweep 706 at the location of dashed lines 714A and 714B, in the present invention the conditions prior to the start of each sweep are very consistent, and therefore dynamic errors at the start of each sweep are prevented. These consistent conditions at the start of each sweep are a direct result of placing the home position in the middle of the sweep causing the start of each sweep to always occur just after the end of the retrace.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A beam deflection system for a CRT having an electron beam for illuminating a phosphor area on the face of the CRT, said beam deflection system comprising:
   vertical positioning means for producing vertical deflection control data for positioning the electron beam at one of a plurality of predefined vertical positions on the face of the CRT;
   horizontal positioning means for producing horizontal deflection control data for sweeping the electron beam from a left side position on the face of the CRT to a right side position on the face of the CRT; and
   home positioning means for controlling said vertical positioning means and said horizontal positioning means to place the electron beam at a home position outside the phosphor area during an idle period of the electron beam and for maintaining the electron beam in said home position during said idle period.

2. The system of claim 1 wherein said home position is located at a horizontal center outside of the phosphor area.

3. The system of claim 1 wherein said home positioning means further comprises:
   means for forcing said vertical deflection control data to a predetermined value; and
   means for holding said horizontal deflection control data at a predetermined value.

4. The system of claim 3 wherein said means for forcing said vertical deflection control data to a predetermine value comprises:
   means for disabling an output of said vertical positioning control data onto a bus; and
   means for forcing said bus to said predetermined value.

5. The system of claim 3 wherein said means for holding said horizontal deflection control data at a predetermined value comprises means for interrupting a counter that produces said horizontal deflection control data.

6. The system of claim 1 wherein said home positioning means places said electron beam at said home position by interrupting a retrace of said electron beam and further wherein a new deflection cycle will start by completing said retrace, whereby dynamic deflection errors caused by inconsistent initial conditions at the start of a horizontal trace are eliminated.

7. A deflection system for a cathode ray tube having an electron beam for illuminating a phosphor area on the face of the cathode ray tube and having a fiber optic faceplate for conducting light from said phosphor area to a viewing area beyond said phosphor area, said system comprising:
   vertical positioning means for producing vertical deflection control data for positioning the electron beam at one of a plurality of predefined vertical positions;
   horizontal positioning means for producing horizontal deflection control data for sweeping the electron beam from a left side position on the fiber optic faceplate of the CRT to a right side position on the fiber optic faceplate of the CRT; and
   home positioning means for controlling said vertical positioning means and said horizontal positioning means to place the electron beam at a home position outside the fiber optic faceplate during an idle period of the electron beam and for maintaining the electron beam in said home position during said idle period.

8. The system of claim 7 wherein said home positioning means further comprises:
   means for forcing said vertical deflection control data to a predetermined value; and
   means for holding said horizontal deflection control data at a predetermined value.

9. The system of claim 8 wherein said means for forcing said vertical deflection control data to a predetermine value comprises:
   means for disabling an output of said vertical positioning control data onto a bus; and
   means for forcing said bus to said predetermined value.

10. The system of claim 8 wherein said means for holding said horizontal deflection control data at a predetermined value comprises means for interrupting a counter that produces said horizontal deflection control data.

11. The system of claim 7 wherein said home positioning means places said electron beam at said home position by interrupting a retrace of said electron beam and further wherein a new deflection cycle will start by completing said retrace, whereby dynamic deflection errors caused by inconsistent initial conditions at the start of a horizontal trace are eliminated.

12. A deflection method for a cathode ray tube having an electron beam for illuminating a phosphor area on the face of the cathode ray tube, said method comprising the steps of:
- (a) producing vertical deflection control data for positioning the electron beam at one of a plurality of predefined vertical positions;
- (b) producing horizontal deflection control data for sweeping the electron beam from a left side position on the face of the CRT to a right side position on the face of the CRT;
- (c) placing the electron beam at a home position outside the phosphor area during an idle period of the electron beam; and
- (d) maintaining the electron beam in said home position during said idle period.

13. The method of claim 12 wherein step (c) further comprises the step of defining said home position to be located at a horizontal center outside of the phosphor area.

14. The method of claim 12 wherein steps (c) and (d) further comprise the steps of:

- (c1) forcing said vertical deflection control data to a predetermined value; and
- (d1) holding said horizontal deflection control data at a predetermined value.

15. The method of claim 14 wherein step (c1) further comprise the disabling an output of said vertical positioning control
- (c1a) disabling an output of said vertical positioning control data onto a bus; and
- (c1b) forcing said bus to said predetermined value.

16. The method of claim 14 wherein step (d1) further comprises the step of interrupting a counter that produces said horizontal deflection control data.

17. The method of claim 12 wherein step (c) further comprises the step of placing said electron beam at said home position by interrupting a retrace of said electron beam at a position near a midpoint of said retrace, whereby dynamic deflection errors caused by inconsistent initial conditions at the start of a horizontal trace are eliminated.

* * * * *